(12) United States Patent
Zhan et al.

(10) Patent No.: US 12,516,254 B2
(45) Date of Patent: Jan. 6, 2026

(54) MTW-ZEOLITE AS SUPPORT FOR SECOND STAGE HYDROCRACKING CATALYSTS WITH IMPROVED SELECTIVITY AND COLD FLOW PROPERTY OF DISTILLATE PRODUCTS

(71) Applicant: Chevron U.S.A. Inc., San Ramon, CA (US)

(72) Inventors: Bi-Zeng Zhan, Albany, CA (US); Tracy M. Davis, Novato, CA (US); Ann Jia-Bao Liang, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 24 days.

(21) Appl. No.: 17/923,788

(22) PCT Filed: May 5, 2021

(86) PCT No.: PCT/US2021/030951
§ 371 (c)(1),
(2) Date: Nov. 7, 2022

(87) PCT Pub. No.: WO2021/226277
PCT Pub. Date: Nov. 11, 2021

(65) Prior Publication Data
US 2023/0174873 A1    Jun. 8, 2023

Related U.S. Application Data

(60) Provisional application No. 63/021,524, filed on May 7, 2020.

(51) Int. Cl.
*C10G 47/04*    (2006.01)
*B01J 6/00*    (2006.01)
(Continued)

(52) U.S. Cl.
CPC .............. *C10G 47/04* (2013.01); *B01J 6/001* (2013.01); *B01J 29/80* (2013.01); *B01J 37/0201* (2013.01);
(Continued)

(58) Field of Classification Search
CPC ........ B01J 6/001; B01J 23/888; B01J 29/166; B01J 29/7869; B01J 29/80; B01J 35/50;
(Continued)

(56) References Cited

U.S. PATENT DOCUMENTS 3,832,449 A    8/1974    Rosinski
7,261,805 B2    8/2007    Grove
(Continued)

FOREIGN PATENT DOCUMENTS

CN    102441424 A    5/2012
CN    103120940 B    5/2015
(Continued)

OTHER PUBLICATIONS

Soltani, S. et al., 2024, RSC Advances, 14, 5380-5389. <DOI: 10.1039/d3ra08792a> (Year: 2024).*
(Continued)

*Primary Examiner* — Brian A McCaig
(74) *Attorney, Agent, or Firm* — Mark Warzel

(57) ABSTRACT

The present process comprises hydrocracking a hydrocarbon feed in a first stage. The catalyst in the first stage is a conventional hydrocracking catalyst. The product from the first stage can then be transferred to a second hydrocracking stage. The catalyst used in the second stage of the present hydrocracking process comprises a base impregnated with metals from Group 6 and Groups 8 through 10 of the Periodic Table. The base of the catalyst used in the present
(Continued)

second hydrocracking stage comprises alumina, an amorphous silica-alumina (ASA) material, a USY zeolite and zeolite ZSM-12.

22 Claims, 6 Drawing Sheets

(51) Int. Cl.
*B01J 29/80* (2006.01)
*B01J 37/02* (2006.01)
*C10G 47/20* (2006.01)
*B01J 35/50* (2024.01)

(52) U.S. Cl.
CPC ............... *C10G 47/20* (2013.01); *B01J 35/50* (2024.01); *B01J 2235/00* (2024.01); *B01J 2235/15* (2024.01)

(58) Field of Classification Search
CPC ............... B01J 37/0009; B01J 37/0201; B01J 37/0207; B01J 2235/00; B01J 2235/15; C10G 47/04; C10G 47/20; C10G 65/10
See application file for complete search history.

(56) References Cited

U.S. PATENT DOCUMENTS

| | | | |
|---|---|---|---|
| 8,778,171 | B2 | 7/2014 | Oliveri |
| 2008/0190811 | A1 | 8/2008 | Mao |
| 2009/0200202 | A1 | 8/2009 | Grande |
| 2009/0301929 | A1 | 12/2009 | Burgfels |
| 2015/0136646 | A1 | 5/2015 | Zhan |
| 2016/0214094 | A1 | 7/2016 | Jia |
| 2022/0112435 | A1* | 4/2022 | Dubreuil ................ C10G 47/36 |

FOREIGN PATENT DOCUMENTS

| | | | | |
|---|---|---|---|---|
| CN | 102471700 | B | 8/2016 | |
| CN | 105916967 | B | 4/2019 | |
| CN | 106807419 | B | 7/2019 | |
| EP | 1779929 | A1 | 5/2007 | |
| JP | 2002523231 | A | 7/2002 | |
| JP | 2007526119 | A | 9/2007 | |
| JP | 2017518171 | A | 7/2017 | |
| WO | 0012213 | A1 | 3/2000 | |
| WO | WO-0030748 | A1 * | 6/2000 | ............ B01J 29/064 |
| WO | 2005084799 | A1 | 9/2005 | |
| WO | 2011002782 | A2 | 1/2011 | |
| WO | 2015073828 | A1 | 5/2015 | |
| WO | 2015164334 | A1 | 10/2015 | |
| WO | 2020144096 | A1 | 7/2020 | |
| WO | 2021226277 | A1 | 11/2021 | |

OTHER PUBLICATIONS

Daniell et al. "Enhanced surface acidity in mixed alumina-silicas: a low-temperature FTIR study." Applied Catalysis A: General 196.2 (2000): 247-260.
"Group notation revised in periodic table." Chemical & Engineering News Archive, 63(5), Feb. 4, 1985, p. 26-27.
Extended European Search Report mailed on Apr. 29, 2024 issued in European Application No. 21799511.7, filed on Oct. 24, 2022, 8 pages.
Neste. "It's all about the base." https://www.neste.com/news/its-all-about-the-base (retrieved Aug. 21, 2025). 2016. 5 pages.
PCT International Search Report and Written Opinion mailed on Aug. 20, 2021, issued in Internatiional Application No. PCT/US2021/030951, filed on May 5, 2021, 9 pages.

* cited by examiner

MTW-ZEOLITE AS SUPPORT FOR SECOND STAGE HYDROCRACKING CATALYSTS WITH IMPROVED SELECTIVITY AND COLD FLOW PROPERTY OF DISTILLATE PRODUCTS

CROSS REFERENCE TO RELATED APPLICATIONS

This application is the national stage application of International Appl. No. PCT/US21/030951, filed on May 5, 2021, and is related to, and claims priority benefit from U.S. Provisional Patent Appl. Ser. No. 63/021,524, filed on May 7, 2020, entitled "MTW-ZEOLITE AS SUPPORT FOR SECOND STAGE HYDROCRACKING CATALYSTS WITH IMPROVED SELECTIVITY AND COLD FLOW PROPERTY OF DISTILLATE PRODUCTS", the disclosures of which are herein incorporated by reference in their entirety.

BACKGROUND

Catalytic hydroprocessing refers to petroleum refining processes in which a carbonaceous feedstock is brought into contact with hydrogen and a catalyst, at a higher temperature and pressure, for the purpose of removing undesirable impurities and/or converting the feedstock to an improved product. Examples of hydroprocessing processes include hydrotreating, hydrodemetallization, hydrocracking and hydroisomerization processes.

A hydroprocessing catalyst typically consists of one or more metals deposited on a support or carrier consisting of an amorphous oxide and/or a crystalline microporous material (e.g., a zeolite). The selection of the support and metals depends upon the particular hydroprocessing process for which the catalyst is employed.

It is well known that zeolites play a key role in hydrocracking and hydroisomerization reactions, and the pore structures of zeolites largely dictate their catalytic selectivity. The two processes achieve different results and different catalysts are required.

Hydrocracking refers to a process in which hydrogenation and dehydrogenation accompany the cracking/fragmentation of hydrocarbons, e.g., converting heavier hydrocarbons into lighter hydrocarbons, or converting aromatics and/or cycloparaffins (naphthenes) into non-cyclic branched paraffins. Hydroisomerization refers to a process in which normal paraffins are isomerized to their more branched counterparts in the presence of hydrogen over a catalyst.

Hydrocracking is quite useful in producing distillates such as diesel fuels. Creating new catalyst combinations that can focus and improve the conversion and selectivity of desired distillate products by hydrocracking processes would be of great use to the industry.

SUMMARY

It has been discovered that when utilizing the novel catalyst of the present process in the second stage of a two-stage hydrocracking process improved middle-distillate production can be achieved. This is true whether the feed is unconverted oil (UCO) or a Fischer-Tropsch (FT) wax.

The process comprises hydrocracking a hydrocarbon feed in a first stage. The catalyst in the first stage is a conventional hydrocracking catalyst. The product from the first stage can then be transferred to a second hydrocracking stage. The catalyst used in the second stage of the present hydrocracking process comprises a base impregnated with metals selected from Group 6 and Groups 8 through 10 of the Periodic Table. The base of the catalyst used in the present second hydrocracking stage comprises alumina, an amorphous silica-alumina (ASA) material, a USY zeolite and zeolite ZSM-12.

Among other factors, it has been discovered that the use of the present catalyst base of the second hydrocracking stage catalyst, which includes ZSM-12, provides numerous advantages. The catalyst system of the second stage results in improved yields and selectivity in desired middle distillate and heavy distillate products, while also improving the cold properties of the products.

DESCRIPTION OF PREFERRED EMBODIMENTS

Figure 1:
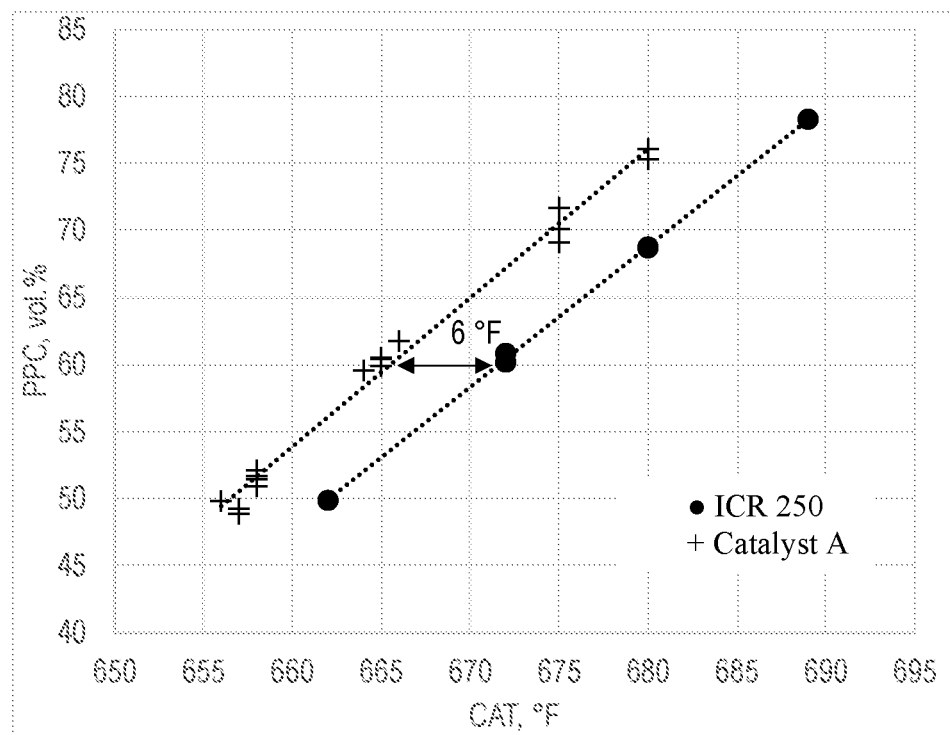
FIG. 1 graphically depicts apparent conversion (<700° F.) vs. Catalyst Temperature for the present second stage catalyst vs. commercial ICR 250.
Figure 2:
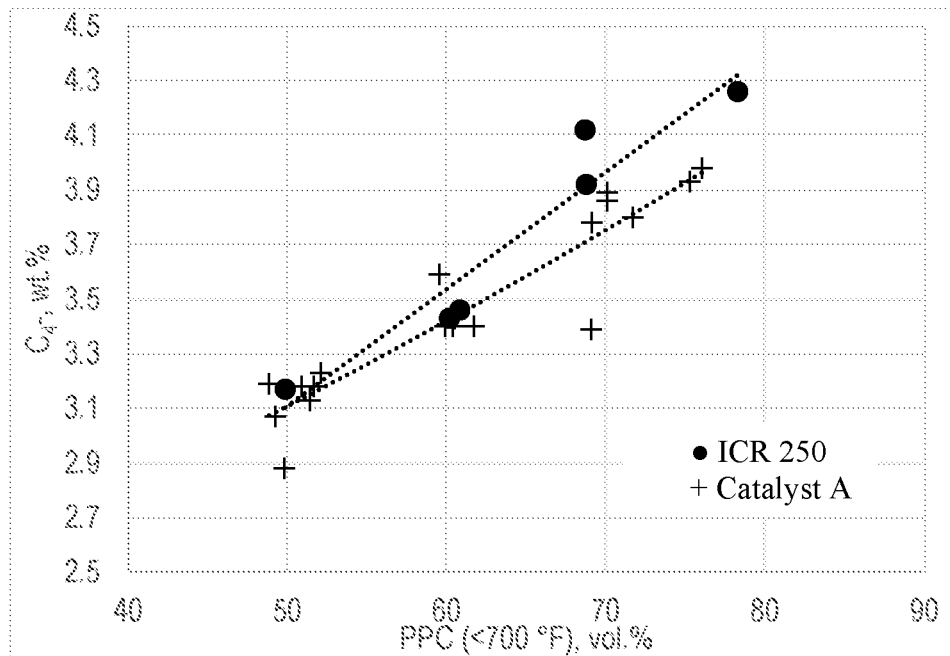
FIG. 2 graphically depicts $C_4$ production in the second stage when using commercial ICR 250 as compared to the present second stage catalyst.
Figure 3:
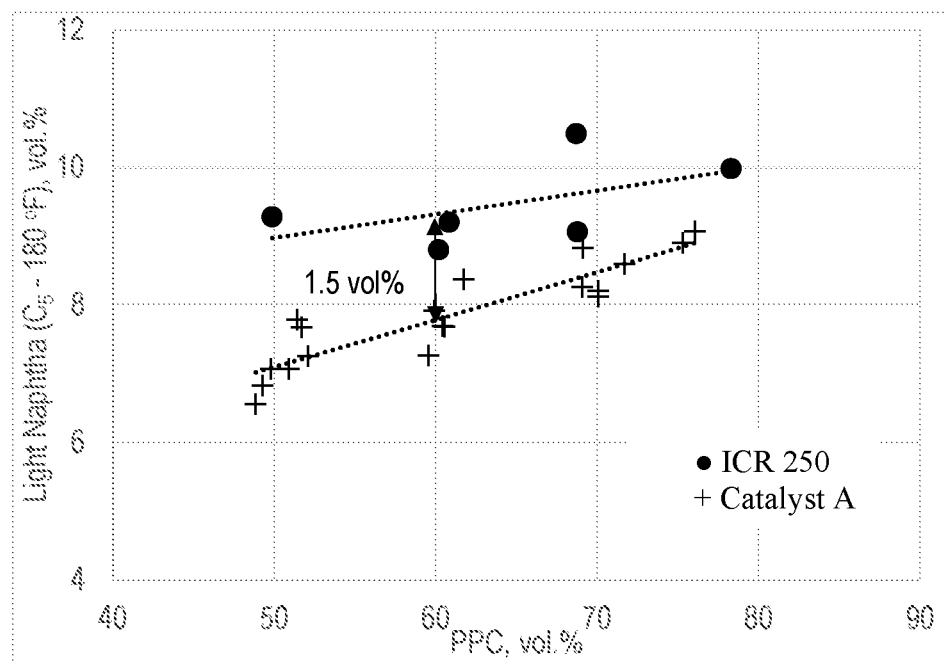
FIG. 3 graphically depicts selectivity of light naphtha in the second stage when using commercial ICR 250 as compared to the present second stage catalyst.
Figure 4:
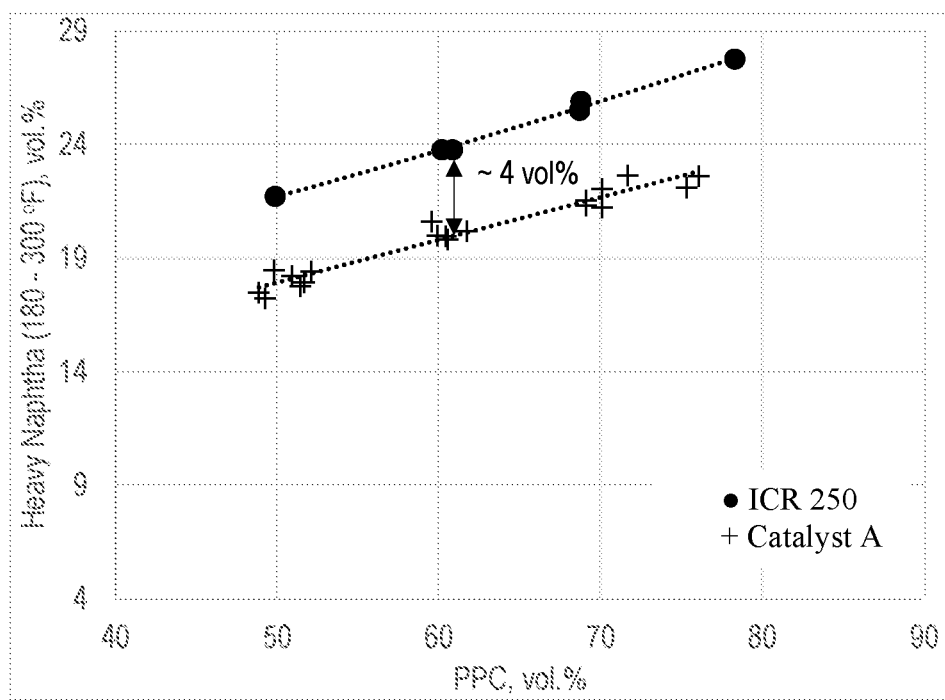
FIG. 4 graphically depicts selectivity of heavy naphtha in the second stage when using commercial ICR 250 as compared to the present second stage catalyst.
Figure 5:
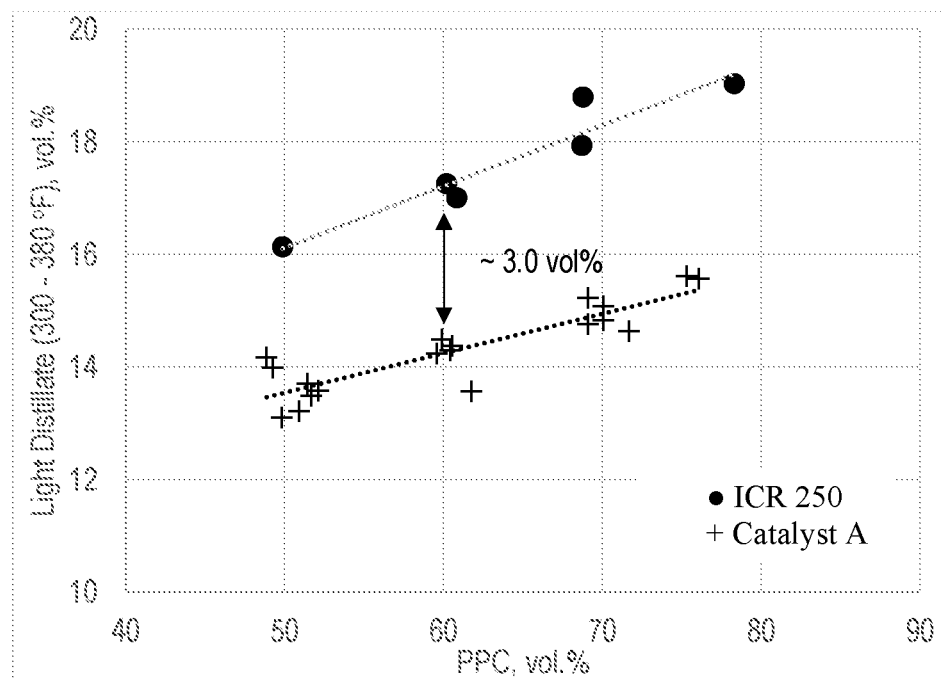
FIG. 5 graphically depicts selectivity of light distillate in the second stage when using commercial ICR 250 as compared to the present second stage catalyst.
Figure 6:
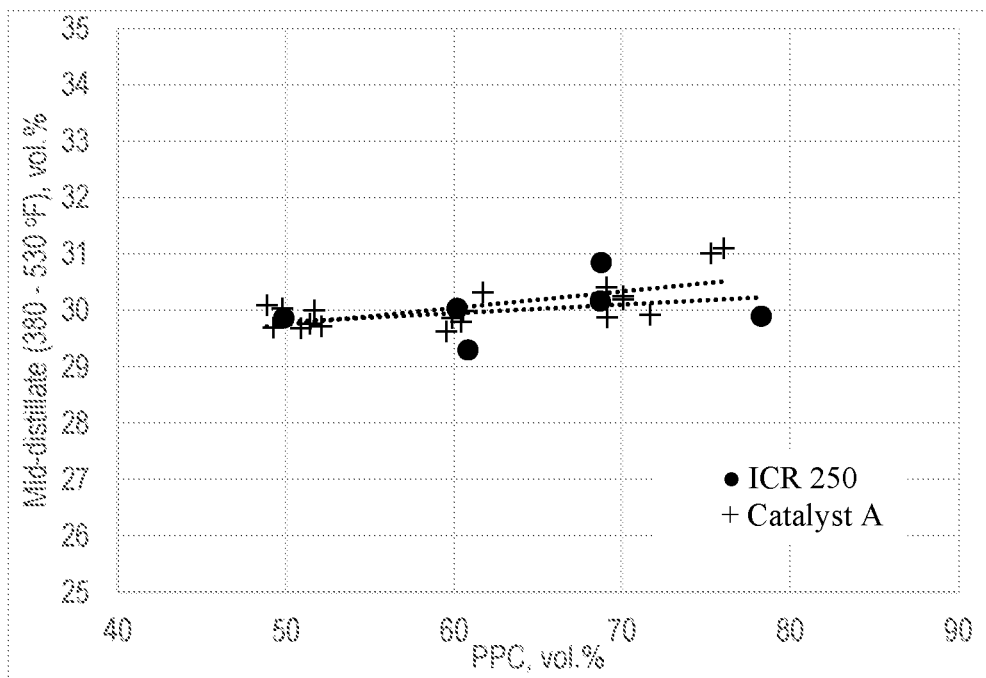
FIG. 6 graphically depicts selectivity of middle distillate in the second stage when using commercial ICR 250 as compared to the present second stage catalyst.
Figure 7:
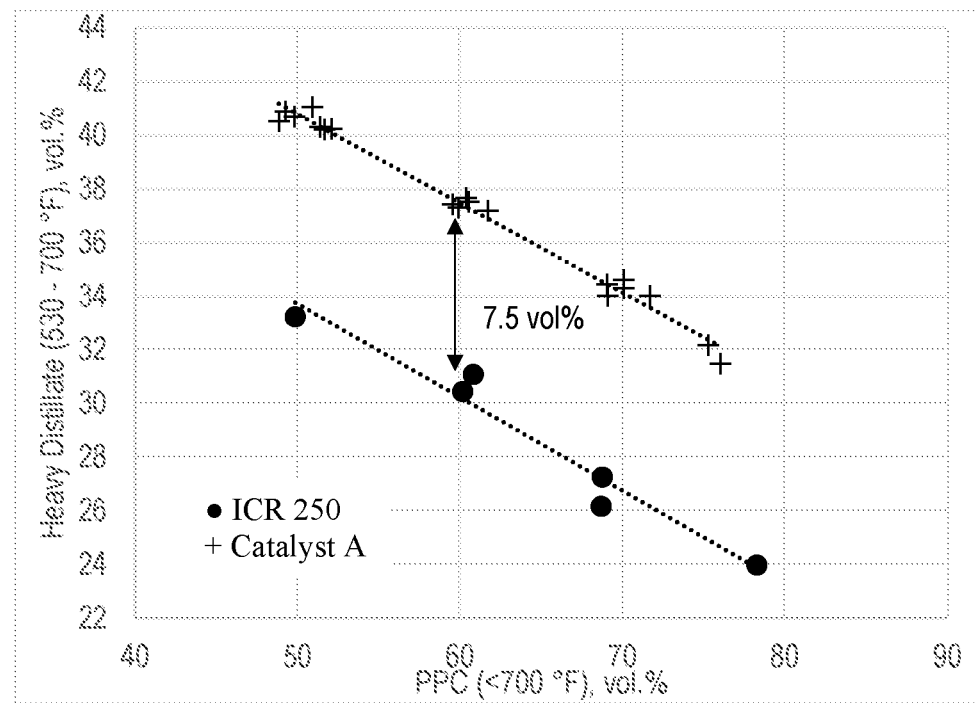
FIG. 7 graphically depicts selectivity of heavy distillate in the second stage when using commercial ICR 250 as compared to present second stage catalyst.
Figure 8:
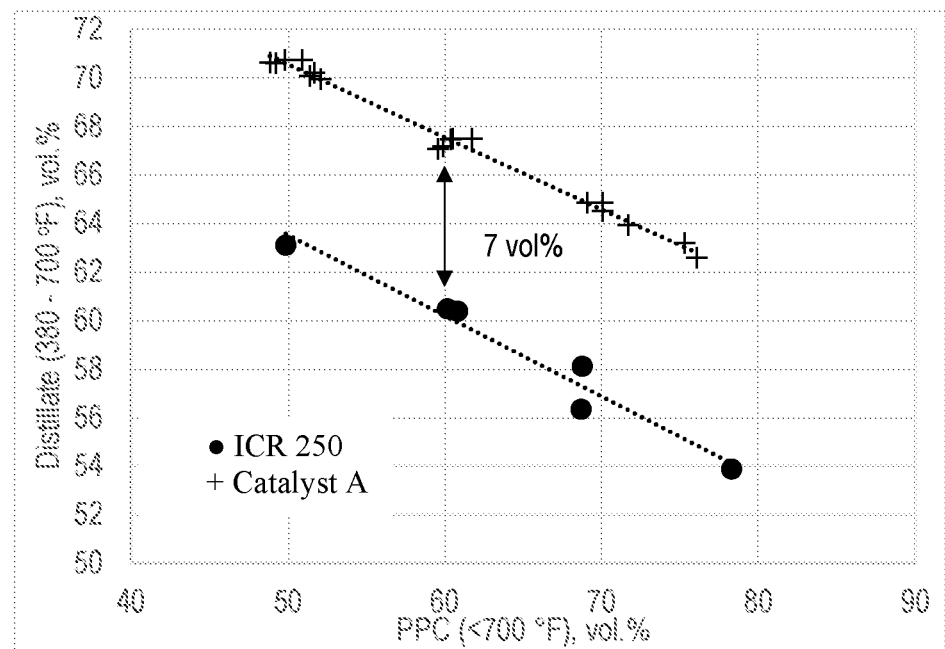
FIG. 8 graphically depicts selectivity of total distillates in the second stage when using commercial ICR 250 as compared to the present second stage catalyst.

The present processes relate to hydrocracking a hydrocarbon feed using two stages. Commercial hydrocracking processes typically include two sections, first stage hydrocracking and second stage hydrocracking. A major difference between the first and second stage hydrocracking reactor reaction environments lies in the very low concentrations of ammonia and hydrogen sulfide in the second stage. The first stage reaction environment is rich in both ammonia and hydrogen sulfide generated by hydrodenitrogenation and hydrodesulfurization of the feed. The feed for the second stage hydrocracking is typically the unconverted oil from the first stage hydrocracking. The present catalyst is designed for the second stage hydrocracking.

The process and catalyst are designed to improve the yields and conversion of heavy distillate (530-700° F.) (277-371° C.) and middle distillate (380-700° F.) (193-277° C.). While the first hydrocracking stage employs a conventional hydrocracking catalyst, the key is in the second stage catalyst. The second stage employs a particular catalyst comprising a base comprised of alumina, an amorphous silica-aluminate (ASA), a USY zeolite and a ZSM-12 zeolite. The base is impregnated with catalytic metals, selected from Group 6 and Groups 8 through 10 of the Periodic Table, preferably Nickel (Ni) and Tungsten (W). The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The base of the catalyst can comprise from about 0.1 to about 40 wt. % alumina base, based on the dry weight of the base, or in another embodiment from about 20 to about 30 wt. % alumina. About 25 wt. % alumina can be used in another embodiment. The base of the catalyst can also comprise from about 30 to about 80 wt. % ASA, based on the dry weight of the base, or in another embodiment from about 55 to about 75 wt. % ASA. The Y zeolite can be optional and can comprise from 0 to about 40 wt. % of the base based on the dry weight of the base. In another embodiment, the Y zeolite can comprise from about 0.1 to about 20 wt. %, or in another embodiment, from about 0.1 to about 10 wt. % of the base. The ZSM-12 component of the base can comprise from about 0.1 to about 40 wt. % of the based on the dry weight of the base, or in another embodiment from about 0.2 to about 10 wt. %, or from about 0.5 to about 5 wt. % of the base.

The alumina can be any alumina known for use in a catalyst base. For example, the alumina can be γ-alumina, η-alumina, θ-alumina, δ-alumina, χ-alumina, or a mixture thereof.

The ASA of the catalyst support is an amorphous silica-alumina material in which the mean mesopore diameter is generally between 70 Å and 130 Å.

In one embodiment, the amorphous silica-alumina material contains $SiO_2$ in an amount of 10 to 70 wt. % of the bulk dry weight of the carrier as determined by ICP elemental analysis, a BET surface area of between 450 and 550 m$^2$/g and a total pore volume of between 0.75 and 1.15 mL/g.

In another embodiment, the catalyst support comprises an amorphous silica-alumina material containing $SiO_2$ in an amount of 10 to 70 wt. % of the bulk dry weight of the carrier as determined by ICP elemental analysis, a BET surface area of between 450 and 550 m$^2$/g, a total pore volume of between 0.75 and 1.15 mL/g, and a mean mesopore diameter is between 70 Å and 130 Å.

In another embodiment, the catalyst support is a highly homogeneous amorphous silica-alumina material having a surface to bulk silica to alumina ratio (S/B ratio) of 0.7 to 1.3, and a crystalline alumina phase present in an amount no more than about 10 wt. %.

$$S/B \text{ Ratio} = \frac{(Si/Al \text{ atomic ratio of the surface measured by } XPS)}{(Si/Al \text{ atomic ratio of the bulk measured by elemental analysis})}$$

To determine the S/B ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition.

Use of XPS for silica-alumina characterization was published by W. Daneiell et al. in Applied Catalysis A, 196, 247-260, 2000. The XPS technique is, therefore, effective in measuring the chemical composition of the outer layer of catalytic particle surface. Other surface measurement techniques, such as Auger electron spectroscopy (AES) and Secondary-ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the S/B ratio and the homogeneity of silica-alumina are determined. How the S/B ratio defines the homogeneity of a particle is explained as follows. An S/B ratio of 1.0 means the material is completely homogeneous throughout the particles. An S/B ratio of less than 1.0 means the particle surface is enriched with aluminum (or depleted with silicon), and aluminum is predominantly located on the external surface of the particles. The S/B ratio of more than 1.0 means the particle surface is enriched with silicon (or depleted with aluminum), and aluminum is predominantly located on the internal area of the particles.

"Zeolite USY" refers to ultra-stabilized Y zeolite. Y zeolites are synthetic faujasite (FAU) zeolites having a SAR of 3 or higher. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor. Such suitable Y zeolites are commercially available from, e.g., Zeolyst, Tosoh and JGC.

The last component of the catalyst base is a MTW zeolite, specifically known as ZSM-12. The ZSM-12 zeolite is a silica rich zeolite comprised of a one-dimensional 12 membered ring channel system with unique pore openings of 5.7 Angstroms to 6.1 Angstroms. The ZSM-12 zeolite is described in detail in U.S. Pat. Nos. 3,832,449 and 4,391,785, the disclosures of which are herein incorporated by reference in their entirety.

ZSM-12 can suitably be prepared by preparing a solution containing at least one cyclic quaternary amine halide, sodium oxide, an oxide of silica, and optionally, an oxide of alumina and water and having a composition in terms of mole ratios of oxides falling within the following ranges:

|  | Broad | Preferred |
| --- | --- | --- |
| OH$^-$/SiO$_2$ | 0.1-0.40 | 0.15-0.25 |
| R/R+M+ | 0.2-0.95 | 0.28-0.90 |
| SiO$_2$/Al$_2$O$_3$ | 40-∞ | 85-500 |
| H$_2$O/OH$^-$ | 20-300 | 5-100 | wherein R is dimethyl pyrrolidinium, dimethyl piperidinium, or dimethyl pyridinium halide, M is an alkali metal and maintaining the mixture until crystals of the zeolite are formed. Thereafter, the crystals are separated from the liquid and recovered. Typical reaction conditions consist of heating the reaction mixture to a temperature of from about 80° C. to 180° C. for a period of time ranging from about 6 hours to 150 days. A more preferred temperature range is from about 100° to about 150° for a period of time ranging from about 2 to 40 days.

ZSM-12 zeolites possess a definite distinguishing crystalline structure whose X-ray diffraction pattern shows the following significant lines:

TABLE 1

| Interplanar Spacing D, Å | Relative Intensity |
|---|---|
| 11.9 ± 0.2 | M |
| 10.1 ± 0.2 | M |
| 4.76 ± 0.1 | W |
| 4.29 ± 0.08 | VS |
| 3.98 ± 0.08 | M |
| 3.87 ± 0.07 | VS |
| 3.49 ± 0.07 | W |
| 3.38 ± 0.07 | M |
| 3.20 ± 0.06 | W |
| 3.05 ± 0.05 | W |
| 2.54 ± 0.03 | W |

These values were determined by standard techniques. The radiation was the K-alpha doublet of copper, and a scintillation counter spectrometer with a strip chart pen recorder was used. The peak heights, and the positions as a function of 2 times theta, where theta is the Bragg angle, were read from the spectrometer chart. From these, the relative intensities, 100 $I/I_o$, where $I_o$, is the where $I_o$, is the intensity of the strongest line or peak, and d (obs.), the interplanar spacing in A, corresponding to the recorded lines, were calculated. In Table the relative intensities are given in terms of the symbols m=medium, w=weak, and vs=very strong. It should be understood that this X-ray diffraction pattern is characteristic of all the species of ZSM-12 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-12 zeolites are commercially available from, e.g, Clariant, Zeolyst, China Catalyst Group.

As described herein, the hydrocracking catalyst of the present process contains one or more metals, which metals are impregnated into the above described base or support. For each embodiment described herein, each metal employed is selected from the group consisting of elements from Group 6 and Groups 3 through 10 of the Periodic Table, and mixtures thereof. In one embodiment, each metal is selected from the group consisting of nickel (Ni), palladium (Pd), platinum (Pt), cobalt (Co), iron (Fe), chromium (Cr), molybdenum (Mo), tungsten (W), and mixtures thereof. In another embodiment, the hydrocracking catalyst contains at least one Group 6 metal and at least one metal selected from Groups 8 through 10 of the periodic table. Exemplary metal combinations include Ni/Mo/W, Ni/Mo, Ni/W, Co/Mo, Co/W, Co/W/Mo and Ni/Co/W/Mo.

The total amount of metal oxide material in the hydrocracking catalyst is from 0.1 wt. % to 90 wt. % based on the bulk dry weight of the hydrocracking catalyst. In one embodiment, the hydrocracking catalyst contains from 2 wt. % to 10 wt. of nickel oxide and from 8 wt. % to 40 wt. % of tungsten oxide based on the bulk dry weight of the hydrocracking catalyst.

A diluent may be employed in the formation of the hydrocracking catalyst. Suitable diluents include inorganic oxides such as aluminum oxide and silicon oxide, titanium oxide, days, ceria, and zirconia, and mixture of thereof. The amount of diluent in the hydrocracking catalyst is from 0 wt. % to 35 wt. % based on the bulk dry weight of the hydrocracking catalyst. In one embodiment, the amount of diluent in the hydrocracking catalyst is from 0.1 wt. % to 25 wt. % based on the bulk dry weight of the hydrocracking catalyst.

The hydrocracking catalyst of the present invention can also contain one or more promoters selected from the group consisting of phosphorous (P), boron (B), fluorine (F), silicon (Si), aluminum (Al), zinc (Zn), manganese (Mn), and mixtures thereof. The amount of promoter in the hydrocracking catalyst is from 0 wt. % to 1.0 wt. % based on the hulk dry weight of the hydrocracking catalyst. In one embodiment, the amount of promoter in the hydrocracking catalyst is from 0.1 wt. % to 5 wt. % based on the bulk dry weight of the hydrocracking catalyst.

Preparation of the Hydrocracking Catalyst for the Second Hydrocracking Stage

In one embodiment, metal deposition is achieved by contacting at least the catalyst support with an impregnation solution. The impregnation solution contains at least one metal salt, such as a metal nitrate or metal carbonate, a solvent, and has a pH between 1 and 5.5, inclusive (1≤pH≤5.5). In one embodiment, the impregnation solution further contains a modifying agent described herein below.

In one embodiment, a shaped hydrocracking catalyst is prepared by:
(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent and having a pH between 1 and 5.5, inclusive (1≤pH≤5.5), and
(e) drying the impregnated extrudate at a temperature sufficient to remove the impregnation solution solvent, to form a dried impregnated extrudate.

In another embodiment, a shaped hydrocracking catalyst is prepared by:
(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent, and a modifying agent, wherein the impregnation solution has a pH between 1 and 5.5, inclusive (1≤pH≤5.5), and
(e) drying the impregnated extrudate at a temperature below the decomposition temperature of the modifying agent and sufficient to remove the impregnation solution solvent, to form a dried impregnated extrudate.

In another embodiment, a shaped hydrocracking catalyst is prepared by:
(a) forming an extrudable mass containing the catalyst base,
(b) extruding the mass to form a shaped extrudate,
(c) calcining the mass to form a calcined extrudate,
(d) contacting the shaped extrudate with an impregnation solution containing at least one metal salt, solvent, and a modifying agent, wherein the impregnation solution has a pH between 1 and 5.5, inclusive (1≤pH≤5.5),
(e) drying the impregnated extrudate at a temperature below the decomposition temperature of the modifying agent and sufficient to remove the impregnation solution solvent, to form a dried impregnated extrudate, and
(f) calcining the dried impregnated extrudate to remove the modifying agent and sufficient to convert at least one metal into oxide.

In one embodiment, a mild add is used in forming the extrudable mass containing the catalyst base. For example in one embodiment a diluted $HNO_3$ add aqueous solution with from 0.5 to 5 wt. % $HNO_3$ is used.

In one embodiment, the impregnation solution comprises a metal carbonate and a modifying agent. Nickel carbonate is the preferred metal salt for use in the preparation of the present catalyst.

The diluent, promoter and/or molecular sieve (if employed) may be combined with the carrier when forming the extrudable mass. In another embodiment, the carrier and (optionally) the diluent, promoter and/or molecular sieve can be impregnated before or after being formed into the desired shapes.

For each embodiment described herein, the impregnation solution has a pH between 1 and 5.5, inclusive ($1 \leq pH \leq 5.5$). In one embodiment, the impregnation solution has a pH between 1.5 and 3.5, inclusive ($1.5 \leq pH \leq 3.5$).

Depending on the metal salts and other components used to form the impregnation solution, before the addition of a basic component the pH of the impregnation solution will typically have a pH of less than 1, and more typically a pH of about 0.5. By adding a basic component to the impregnation solution to affect a pH adjustment to 1 and 5.5, inclusive ($1 \leq pH \leq 5.5$), the add concentration is eliminated or reduced to a level which, during calcination, does not acid-catalyze decomposition of the ammonium nitrate at a rate rapid enough to have a deleterious effect on the hydrocracking catalyst. In one embodiment, the add concentration is eliminated or reduced to a level which, during calcination, does not add-catalyze decomposition of the ammonium nitrate at a rate rapid enough to have a deleterious effect on more than 10 wt. % of the bulk dry weight of the hydrocracking catalyst (e.g, does not produce fines or fractured extrudates which account for more than 10 wt. % of the bulk dry weight of the post-calcined hydrocracking catalyst).

The basic component can be any base which can dissolve in the solvent selected for the impregnation solution and which is not substantially deleterious to the formation of the catalyst or to the hydrocracking performance of the catalyst, meaning that the base has less than a measurable effect on, or confer less than a material disadvantage to, the performance of the hydrocracking catalyst. A base which is not substantially deleterious to the formation of the catalyst will not reduce catalyst activity by more than 10° F. (5.5° C.) based on the performance of the hydrocracking catalyst without pH correction.

Where the hydrocracking catalyst is to be used in the present hydrocracking process, one suitable base is ammonium hydroxide. Other exemplary bases include potassium hydroxide, sodium hydroxide, calcium hydroxide, and magnesium hydroxide.

In one embodiment, deposition of at least one of the metals is achieved in the presence of a modifying agent selected from the group consisting of compounds represented by structures (1) through (4), including condensed forms thereof:

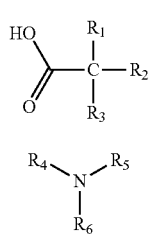

(1)

(2)

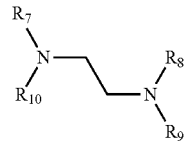

(3)

$$OH-R_{11}-OH \quad (4)$$

wherein:
(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ aminoalkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;
(2) $R_4$ through $R_{10}$ are independently selected from the group consisting of hydrogen; hydroxyl; and linear or branched, substituted or unsubstituted $C_2$-$C_3$ carboxyalkyl groups; and
(3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and oxoalkyl groups.

Representative examples of modifying agents useful in this embodiment include 2,3-dihydroxy-succinic acid, ethanedioic acid, 2-hydroxyacetic acid, 2-hydroxy-propanoic acid, 2-hydroxypropane-1,2,3-tricarboxylic acid, methoxyacetic acid, cis-1,2-ethylene dicarboxylic acid, hydroethane-1,2-dicarboxylic acid, ethane-1,2-diol, propane-1,2,3-triol, propanedioic acid, and α-hydro-ω-hydroxypoly(oxyethylene).

In one embodiment, the modifying agent used is 2-hydroxypropane-1,2,3,-tricarboxylic acid (citric add). Such a modifying agent provides excellent results, is economic and readily available.

In an alternate embodiment, deposition of at least one of the metals is achieved in the presence of a modifying agent selected from the group consisting of N,N'-bis(2-aminoethyl)-1,2-ethane-diamine, 2-amino-3-(1H-indol-3-yl)-propanoic acid, benzaldehyde, [[(carboxymethyl)imino]bis(ethylenenitrilo)]-tetra-acetic acid, 1,2-cyclohexanediamine, 2-hydroxybenzoic acid, thiocyanate, thiosulfate, thiourea, pyridine, and quinoline.

The modifying agent impedes metal aggregation, thereby enhancing the activity and selectivity of the catalyst.

For each embodiment described herein, when employed, the amount of modifying agent in the pre-calcined hydrocracking catalyst is from 2 wt. % to 18 wt. % based on the bulk dry weight of the hydrocracking catalyst.

The calcination of the extruded mass can vary. Typically, the extruded mass can be calcined at a temperature between 752° F. (400° C.) and 1200° F. (650° C.) for a period of between 1 and 3 hours.

Non-limiting examples of suitable solvents include water and $C_1$ to $C_3$ alcohols. Other suitable solvents can include polar solvents such as alcohols, ethers, and amines. Water is a preferred solvent. It is also preferred that the metal compounds be water soluble and that a solution of each be formed, or a single solution containing both metals be formed. The modifying agent can be prepared in a suitable solvent, preferably water.

The three solvent components can be mixed in any sequence. That is, all three can be blended together at the same time, or they can be sequentially mixed in any order in an embodiment, it is preferred to first mix the one or more metal components in an aqueous media, than add the modifying agent.

The amount of metal precursors and modifying agent (when employed) in the impregnation solution should be selected to achieve preferred ratios of metal to modifying agent in the catalyst precursor after drying.

The calcined extrudate is exposed to the impregnation solution until incipient wetness is achieved, typically for a period of between 1 and 100 hours (more typically between 1 and 5 hours) at room temperature to 212° F. (100° C.) while tumbling the extrudates, following by aging for from 0.1 to 10 hours, typically from about 0.5 to about 5 hours.

The drying step is conducted at a temperature sufficient to remove the impregnation solution solvent, but below the decomposition temperature of the modifying agent. In another embodiment, the dried impregnated extrudate is then calcined at a temperature above the decomposition temperature of the modifying agent, typically from about 500° F. (260° C.) to 1100° F. (590° C.), for an effective amount of time. The present invention contemplates that when the impregnated extrudate is to be calcined, it undergo drying during the period where the temperature is being elevated or ramped to the intended calcination temperature. This effective amount of time will range from about 0.5 to about 24 hours, typically from about 1 to about 5 hours. The calcination can be carried out in the presence of a flowing oxygen-containing gas such as air, a flowing inert gas such as nitrogen, or a combination of oxygen-containing and inert gases.

In one embodiment, the impregnated extrudate is calcined at a temperature which does not convert the metals to metal oxides. Yet in another embodiment, the impregnated extrudate can be calcined at a temperature sufficient to convert the metals to metal oxides.

The dried and calcined hydrocracking catalysts of the present invention can be sulfided to form an active catalyst. Sulfiding of the catalyst precursor to form the catalyst can be performed prior to introduction of the catalyst into a reactor (thus ex-situ presulfiding), or can be carried out in the reactor (in-situ sulfiding).

Suitable sulfiding agents include elemental sulfur, ammonium sulfide, ammonium polysulfide (($NH_4$)$_2S_x$), ammonium thiosulfate (($NH_4$)$_2S_2O_3$), sodium thiosulfate ($Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), aqueous ammonium sulfide.

Generally, the sulfiding agent is present in an amount in excess of the stoichiometric amount required to form the sulfided catalyst. In another embodiment, the amount of sulfiding agent represents a sulphur to metal mole ratio of at least 3 to 1 to produce a sulfided catalyst.

The catalyst is converted into an active sulfided catalyst upon contact with the sulfiding agent at a temperature of 150° F. to 900° F. (66° C. to 482° C.), from 10 minutes to 15 days, and under a $H_2$-containing gas pressure of 101 kPa to 25,000 kPa. If the sulfidation temperature is below the boiling point of the sulfiding agent, the process is generally carried out at atmospheric pressure. Above the boiling temperature of the sulfiding agent/optional components, the reaction is generally carried out at an increased pressure. As used herein, completion of the sulfidation process means that at least 95% of stoichiometric sulfur quantity necessary to convert the metals into for example, $CO_9S_8$, $MoS_2$, $WS_2$, $Ni_3S_2$, etc., has been consumed.

In one embodiment, the sulfiding can be carded out to completion in the gaseous phase with hydrogen and a sulfur-containing compound which is decomposable into $H_2S$. Examples include mercaptanes, $CS_2$, thiophenes, DMS, DMDS and suitable S-containing refinery outlet gasses. The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebullated process and rotary furnace).

The contacting between the catalyst precursor with hydrogen and a sulfur-containing compound can be done in one step at a temperature of 68° F. to 700° F. (20° C. to 371° C.) at a pressure of 101 kPa to 25,000 kPa for a period of 1 to 100 hrs. Typically, sulfidation is carded out over a period of time with the temperature being increased or ramped in increments and held over a period of time until completion.

In another embodiment sulfidation can be in the gaseous phase. The sulfidation is done in two or more steps, with the first step being at a lower temperature than the subsequent step(s).

In one embodiment, the sulfidation is carried out in the liquid phase. At first, the catalyst precursor is brought in contact with an organic liquid in an amount in the range of 20% to 500% of the catalyst total pore volume. The contacting with the organic liquid can be at a temperature ranging from ambient to 248° F. (120° C.). After the incorporation of an organic liquid, the catalyst precursor is brought into contact with hydrogen and a sulfur-containing compound.

In one embodiment, the organic liquid has a boiling range of 200° F. to 1200° F. (93° C. to 649° C.). Exemplary organic liquids include petroleum fractions such as heavy oils, lubricating oil fractions like mineral lube oil, atmospheric gas oils, vacuum gas oils, straight run gas oils, white spirit, middle distillates like diesel, jet fuel and heating oil, naphtha, and gasoline. In one embodiment, the organic liquid contains less than 10 wt. % sulfur, and preferably less than 5 wt.

The present catalyst is deployed in the second stage of a two-stage hydrocracking unit, with or without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

Two stage hydrocracking units can also be operated in a partial conversion configuration (meaning one or more distillation units are positioned within hydrocracking loop for the purpose of stripping of one or more streams that are passed on for further hydroprocessing). Operation of the hydrocracking unit in this manner allows a refinery to withdraw desirable product components such as waxy base oils to pass out of the hydrocracking loop for processing by equipment better suited for processing these components, e.g., isomerization units to produce high value base oil.

The hydrocracking conditions generally include a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

The use of the present catalyst as a catalyst in a second hydrocracking stage results in much improved selectivity and yield of desirable middle distillate and heavy distillate products relative to the use of more traditional second hydrocracking stage catalysts. For example, the present process using the present catalyst in the second stage can provide a selectively in distillate products having a boiling point in the range of from 380-700° F. (193-371° C.) of at least 50% wt. %. In another embodiment, the selectivity realized can be at least 65% or even at least 80%. The selectivity that can be realized for heaving distillate products having a boiling point range of 530-700° F. (277-371° C.) is at least 15 wt. %, but can also be at least 20 wt. % or even at least 25 wt. %. For middle distillate products having a boiling point in the range of 380-530° F. (193-277° C.) a selectivity of at least 35% can be realized, or in another embodiment at least 45 wt. % or even at least 55 wt. %. The cold properties of the products are also improved relative to the products obtained when using more traditional second hydrocracking stage catalysts.

Example 1

The following in Table 1 an example of a catalyst that can be used in the second stage of a hydrocracker in accordance with the present process. The catalyst base is detailed, as well as the metals in the finished catalyst.

TABLE 1

| Catalyst A Base | |
|---|---|
| USY Zeolite, wt % | 1.5 |
| ZSM-12, wt % | 0.75 |
| ASA, wt % | 72.75 |
| Alumina, wt % | 25 |
| Porosity by $N_2$ uptake | |
| Surface area, $m^2/g$ | 419 |
| Mean mesopore diameter, Å | 96 |
| Total pore volume, cc/g | 0.88 |
| Finished catalysts metal content, wt % | |
| Nickel oxide (NiO) | 4.6 |
| Tungsten oxide ($WO_3$) | 31.4 |
| Porosity by $N_2$ uptake | |
| Surface area, $m^2/g$ | 245 |
| Mean mesopore diameter, A | 91 |
| Total pore volume, cc/g | 0.456 |

Example 2

ZSM-12 Zeolite-Containing Catalyst

A hydrocracking catalyst in accordance with the present process, Catalyst A above in Example 1, was prepared per the following procedure: 72.75 parts by weight silica-alumina powder (obtained from Sasol), 25 parts by weight pseudo boehmite alumina powder (obtained from Sasol), 1.5 parts by weight of a zeolite Y, and 0.75 parts by weight of zeolite ZSM-12 were mixed well. A diluted $HNO_3$ acid aqueous solution (1 wt. %) was added to the mix powder to form an extrudable paste. The paste was extruded in $1/16$" asymmetric quadrilobe shape, and dried at 250° F. (121° C.) overnight. The dried extrudates were calcined at 1100° F. (593° C.) for 1 hour with purging excess dry air, and cooled down to room temperature.

Impregnation of Ni and W was done using a solution containing ammonium metatungstate and nickel carbonate to the target metal loadings of 4.6 wt. % NiO and 31.4 wt. % $WO_3$ in bulk dry weight of the finished catalyst. A modifying agent, citric acid (with acid/Ni molar ratio of 0.79), was mixed with nickel carbonate basic hydrate along with DI water initially. The nickel/acid solution was then heated to 149° F. (65° C.) in a water bath for the decomposition of carbonate before adding ammonium metatungstate to the solution. The total volume of the solution matched the 103% water pore volume of the base extrudate sample (incipient wetness method). The metal solution was added to the base extrudates gradually while tumbling the extrudates. When the solution addition was completed, the soaked extrudates were aged for 2 hours. Then the extrudates were dried at 250° F. (121° C.) for 2 hours. The dried extrudates were calcined at 400° F. (204° C.) for 1 hour with purging excess dry air, and cooled down to room temperature.

Example 3

The present run displays the second stage performance of the present second stage catalyst for an unconverted oil (UCO) feed received from a first stage hydrocracker. The results are compared to that when using a conventional, commercially available hydrocracking catalyst, specifically ICR 250.

Table 2 contains the feed properties of the UCO feed (ABQ1695) used in this study. The UCO feed was collected from a first stage hydrocracker.

TABLE 2

| Physical Properties of Feed | |
|---|---|
| Feeds: | UCO |
| Source | First hydrocracker |
| API Gravity | 31.0 |
| Sulfur, ppm wt. | 20.2 |
| Nitrogen, ppm wt. | 1.2 |
| Asphaltene, ppm | 156 |
| Hydrocarbon type by 22 × 22 | |
| Aromatics, vol. % | 13.1 |
| Naphthenics, vol. % | 64.5 |
| Paraffinics, vol. % | 22.4 |
| D2887 Simdist, wt. %-° F. | |
| 0.5/15 | 529/638 |
| 10/30 | 685/752 |
| 50/ | 822 |
| 70/90 | 883/972 |
| 95/99.5 | 1007/1059 |

The second stage liquid recycle hydrocracking performance testing was conducted using a conventional two stage hydrocracking set up.

One hundred thirty cc of lab prepared Catalyst A from Example 1 was loaded in three zones in a 1" diameter reactor with one preheater and two after-heaters. The catalyst extrudates were shortened to L/D=2-3. 80 mesh glass beads were used to fill the voids among catalyst particles to prevent feed channeling and to improve contacting. The catalyst was sulfided with standard sulfiding feed (NGQ1664) that was spiked with 45 ppm of TBA.

The following conditions were used in the runs:

| Feed | UCO feed from first stage |
|---|---|
| Designed PPC, vol % | 50, 60, 70 |
| LHSV, h$^{-1}$ | 1.5 |
| HCR Inlet Pressure, psig | 2300 |
| Hydrogen Partial Pressure, psia | ~2100 |
| Recycle H$_2$ Rate, SCF/BBL | 5000 |
| Reactor Temperature, ° F. | 655-680 |

The UCO feed was tested. Reactor temperature was adjusted to achieve the desired per pass conversions (PPC). Performance of Second Stage with UCO Feed from First Stage—

The initial temperature after startup was set to be 680° F. to desorb the N species, which was used to titrate acid sites of zeolites in the present catalyst. After being in operation for approximately 250 h, the catalyst started to line out with the NH3 content in the gas phase after the reactor was below 5 ppm. The reactor temperature as adjusted to target three PPC conversions (50 Iv %, 60 Iv % and 70 Iv %). Data at these PPC conversions were collected and analyzed.

Table 3 shows individual yields and run conditions for Catalyst A in the three conversions. Total recycle H$_2$ rate was set at 5000 SCF/BBL with the make-up H$_2$ gas fluctuated between 500 SCF/BBL to 750 SCF/BBL. The H$_2$ consumption of Catalyst A is nearly the same (~950 SCF/BBL) for three PPC conversions. These H$_2$ consumptions are similar to those of conventional hydrocracking catalysts such as commercial ICR 250, within the error of margin.

TABLE 3

Yield structure for the second stage hydracracking with UCO feed.

| REACTOR TEMP, ° F. | 657 | 665 | 675 |
|---|---|---|---|
| OVERALL LHSV | 1.48 | 1.46 | 1.53 |
| PER PASS CONVERSION | 49.26 | 59.91 | 70.08 |
| PRESSURE, PSIG | 2300 | 2300 | 2300 |
| H$_2$ AVG PRESS, PSIA | 2139 | 2129 | 2106 |
| Hydrogen to Oil Ratio, SCF/B | 5501 | 5667 | 5498 |
| RECYCLE GAS, SCF/B | 4973 | 5039 | 4750 |
| NO LOSS PROD. YIELDS, WT. % | | | |
| C$_4$- | 3.07 | 3.40 | 3.86 |
| C$_5$-300° F. | 20.16 | 22.89 | 24.8 |
| 300-380° F. | 12.32 | 12.73 | 13.04 |
| 380-530° F. | 27.2 | 27.26 | 27.51 |
| 530° F.—RCP | 38.91 | 35.36 | 32.47 |
| RECYCLE CUT POINT, ° F. | 700 | 700 | 700 |
| Diesel Cloud point, ° C. | — | −6 | −10 |
| TOTAL C$_4$- | 3.07 | 3.4 | 3.86 |
| TOTAL C$_5$+ | 98.58 | 98.23 | 97.83 |

The apparent conversion (<700° F., 371° C.) over the present second stage cracking catalyst compared to commercial ICR 250 is displayed in FIG. 1. The result demonstrated that the newly developed Catalyst A was about 6° F. more active than the commercial ICR 250 within the conversion range of 50 Iv % to 75 Iv %.

The yield structures of different products vs. apparent conversion (<700° F.) is displayed in FIGS. 2-8. Less gas production was generated from Catalyst A as compared to ICR 250. The gap was widened at higher conversions. Catalyst A also generated less light naphtha, heavy naphtha and jet products than ICR 250, with a gap of more than 3 vol %. The loss production in lighter fractions was compensated in heavier products. Approximately 7 vol % gain in mid-distillates and heavy diesel with Catalyst A was observed over the commercial catalyst ICR 250 throughout the conversion range of 50 Iv % to 70 Iv %. No significant difference in kerosene production was observed between the two catalysts.

Three products were collected daily for inspections. The cold flow property of diesel product from two catalysts was examined. The pour and cloud points of diesel collected at 60% conversion for Catalyst A were <−60° C. and −37° C., respectively. The diesel cloud point is 14° C. lower than that collected at the same conversion for ICR 250.

Figure 9:
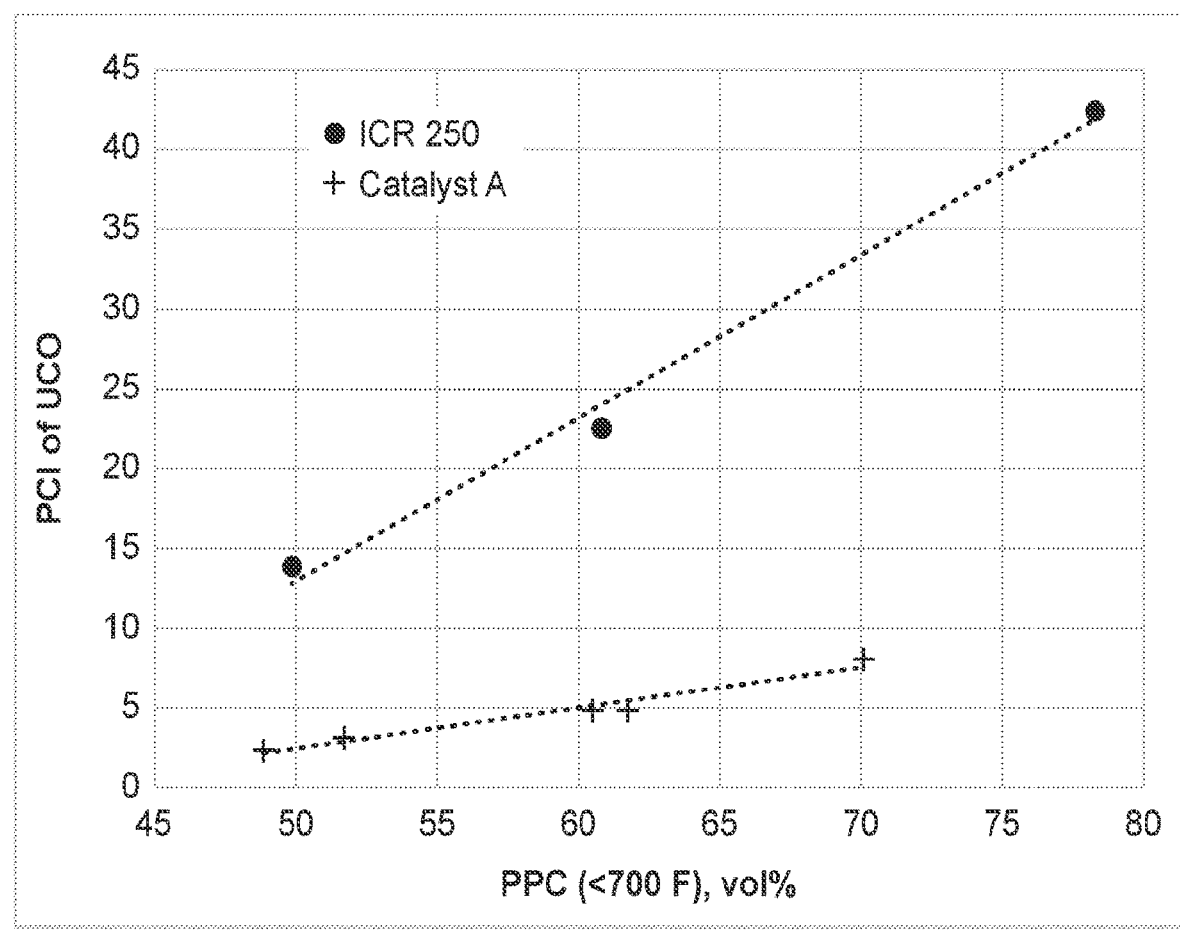
FIG. 9 graphically depicts selectivity of the polycyclic index when using the present second stage catalyst.

Improvement in aromatic saturation with Catalyst A was also observed. FIG. 9 shown polycyclic Index (PCI) of unconverted oil (UCO) in term of per pass conversion. As shown in FIG. 9, PCI of UCO increased with increasing per pass conversion. The PCI values are 5 to 10 times lower of the UCO products generated with Catalyst A than those produced from commercial ICR 250. This result indicates that Catalyst A does better aromatic saturation than the commercial ICR 250.

Example 4

This present run deploys the present catalyst for a FT wax feed received from a GTL plant. The results are compared to that when using a conventional hydrocracking catalyst, ICR 250.

Table 2 contains the feed properties of the FT wax used in this study. The wax was produced at a gas-to-liquids plant.

TABLE 4

Physical Properties of Feed

| Feeds: | FT Wax |
|---|---|
| Source | GTL Plant |
| API Gravity | 42.0 |
| Sulfur, ppm wt. | <5 ppm |
| Nitrogen, ppm wt. | 15.6 |
| Oxygen, wt % | 0.57 |
| D2887 Simdis, wt %, ° F. | |
| 0.5/5 | 455/595 |
| 10/30 | 618/694 |
| 50/ | 774 |
| 70/90 | 875/1023 |
| 95/99.5 | 1216/1235 |

The hydrocracking stage employed Catalyst A from Examples 1 and 2.

The following conditions were used in this run:

| Feed: | FT Wax |
|---|---|
| Designed PPC, vol % | 65 |
| LHSV, h$^{-1}$ | 1.2 |
| HCR Inlet Pressure, psig | 1000 |
| Hydrogen Partial Pressure, psia | ~900 |

| Feed: | FT Wax |
|---|---|
| Recycle H$_2$ Rate, SCF/BBL | 4750 |
| Reactor Temperature, ° F. | 668-673 |

The catalyst system was tested with FT wax from a commercial unit GTL unit. Table 5 below shows the yield structure and run conditions with both Catalyst A and ICR 250. The test results indicate that Catalyst A improves diesel yield by at least 1 wt. % over ICR 250 at 65% PPC.

Figure 10:
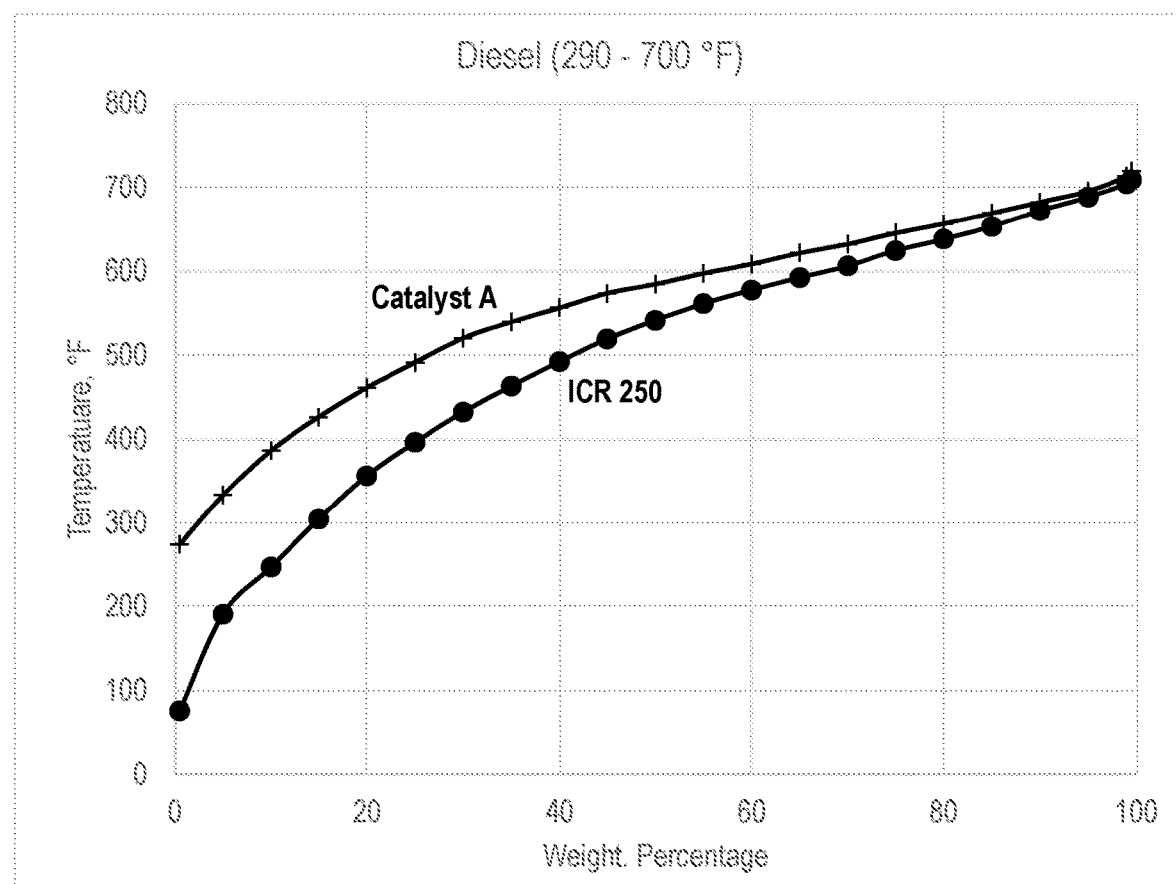
FIG. 10 graphically depicts the improvement in heavy diesel when using the present second stage catalyst.

Improvement in cold flow properties of diesel product was observed with Catalyst A. As shown in Table 5, the diesel cloud point at 65% PPC was −10° C. with Catalyst A as compared to −6° C. with ICR 250, a 4° C. improvement. The improvement could be more significant if we account for the difference in the boiling range of the diesel products. As shown in FIG. 10, the diesel generated with ICR 250 contains more than 15 wt. % lighter products than the diesel generated with Catalyst A even though both diesels have an end boiling point of 700° F. The improvement in cold flow property is mostly likely associated with the addition of ZSM-12 in the new catalyst.

Due to the high paraffinic nature of this feedstock, little or no aromatic compounds were detected in the products as indicated by the low PCI values.

TABLE 5

Yield structure with FT wax feed

| CATALYST | ICR 250 | | CATALYST A | |
|---|---|---|---|---|
| RUN NUMBERS | 1 | 1 | 2 | 2 |
| RUN HOURS | 176-188 | 236-260 | 830-842 | 878-890 |
| REACTOR TEMP, ° F. | 662 | 663 | 673 | 673 |
| OVERALL LHSV, H$^{-1}$ | 1.22 | 1.2 | 1.22 | 1.21 |
| PER PASS CONVERSION | 65.32 | 63.96 | 65.63 | 65.45 |
| PRESSURE, PSIG | 998 | 1001 | 1000 | 1000 |
| H$_2$ AVG PRESSURE, PSIA | 880 | 901 | 916 | 917 |
| TOTAL GAS IN, SCF/B | 4996 | 4763 | 5064 | 5102 |
| RECYCLE GAS, SCF/B | 4732 | 4519 | 4768 | 4809 |
| NO LOSS PROD. YIELDS | WT. % | WT. % | WT. % | WT. % |
| C$_1$ | 0.14 | 0.11 | 0.1 | 0.09 |
| C$_2$ | 0.05 | 0.05 | 0.05 | 0.05 |
| C$_3$ | 0.38 | 0.43 | 0.41 | 0.38 |
| iC$_4$ | 0.43 | 0.62 | 0.82 | 0.77 |
| nC$_4$ | 0.25 | 0.3 | 0.61 | 0.58 |
| C$_5$-290° F. | 12.23 | 12.24 | 10.61 | 10.1 |
| 290° F.—RCP | 86.48 | 86.18 | 87.48 | 88.12 |
| RECYCLE CUT POINT, ° F. | 705 | 701 | 700 | 700 |
| H$_2$ CONS(CHEM), SCF/B | 351 | 325 | 413 | 410 |

Example 5

Composition of Hydrocracking Catalysts with ZSM-12

| | Commercially available hydrocracking catalyst | With ZSM-12 | |
|---|---|---|---|
| | | Catalyst bases | |
| | Al$_2$O$_3$, Siral-40 (ASA), USY | Al$_2$O$_3$, Siral-40 (ASA) 0.7% ZSM-12 + 8% USY | Al$_2$O$_3$, Siral-40 (ASA) 0.7% ZSM-12 + 3% USY |
| NiO + WO$_3$, wt % | 32 | 32 | 32 |
| Modifying agent | Yes | Same as commercial catalyst | Same as commercial catalyst |
| Particle density, g/cc | 1.4 | 1.4 | 1.4 |

Performance of Hydrocracking Catalysts with ZSM-12 with the UCO Feed at a Single-Stage Once Through (SSOT) Hydrocracking Application.

| | Base | With ZSM-12 | |
|---|---|---|---|
| | | Catalyst bases | |
| | Al$_2$O$_3$, Siral-40, USY | Al$_2$O$_3$, Siral-40 0.7% ZSM-12 + 8% USY | Al$_2$O$_3$, Siral-40 0.7% ZSM-12 + 3% USY |
| Catalyst temperature required for 60 wt % conversion, ° F. | 674 | 668 | 682 |
| Diesel (300-700° F.) | | | |
| Cloud Point, ° C. | −17 | −18 | −23 |
| Pour Point, ° C. | −49 | −50 | −49 |
| UCO (700° F.+) | | | |
| Waxy VI | 140 | 135 | 130 |
| Dewaxed VI | 126 | 127 | 130 |
| Wax Content, wt % | 17 | 9.1 | 4.4 |
| Cloud Point, ° C. | 41 | 36 | 16 |
| Pour Point, ° C. | 40 | 28 | 14 |

Hydrocracking UCO ABQ1695 in SSOT application: 1.5 LHSV, 2000 PSIG H2, 5000 SCF/B ZSM-12 containing catalysts greatly improved diesel and UCO cold flow property. It reduced the wax content in UCO without any negative impact on its VI.

|  | Base | With ZSM-12 | |
| --- | --- | --- | --- |
|  | Catalyst bases | | |
|  | $Al_2O_3$, Siral-40, USY | $Al_2O_3$, Siral-40 ZSM-12 + 8% USY | $Al_2O_3$, Siral-40 ZSM-12 + 3% USY |
| Catalyst temp required for 60 wt % conversion, °F. | 674 | 668 | 682 |
| Average Non-Loss Yield, wt % | | | |
| $C_4-$ | 2.1 | 2.3 | 2.5 |
| $C_5$-250° F. | 11.4 | 10.8 | 10.4 |
| 250-550° F. | 36.0 | 35.9 | 35.0 |
| 550-700° F. | 16.9 | 17.4 | 18.7 |
| Total Distillate (250-700° F.) | 53.0 | 53.5 | 53.6 |
| Recalculated yield structure with 380° F.+ diesel cut point | | | |
| $C_4-$ | 2.1 | 2.3 | 2.5 |
| $C_5$-250° F. | 11.4 | 10.8 | 10.4 |
| 250-380° F. | 16.0 | 15.3 | 13.9 |
| 380-700° F. | 37.0 | 38.1 | 39.7 |

Hydrocracking UCO ABQ1695 in SSOT application: 1.5 LHSV, 2000 PSIG H2, 5000 SCF/B Using the present catalyst, containing ZSM-12, the yield of heavy diesel is greatly increased by over 1.5% while also improving the cold flow properties of the diesel and remaining UCO.

What is claimed is:

1. A hydrocracking catalyst comprising a catalyst support base of alumina, an amorphous silicia-alumina, a USY zeolite and ZSM-12, wherein the hydrocracking catalyst comprises a modifying agent, and wherein the modifying agent is selected from the group consisting of compounds represented by structures (1) through (4), and condensated forms thereof:

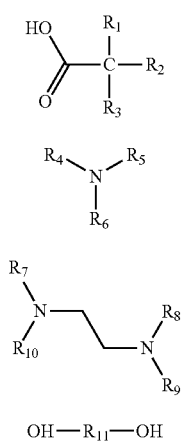

wherein:
(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ aminoalkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;
(2) $R_4$ through $R_{10}$ are independently selected from the group consisting of hydrogen; hydroxyl; and linear or branched, substituted or unsubstituted $C_2$-$C_3$ carboxyalkyl groups; and
(3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and $C_1$-$C_3$ oxoalkyl groups.

2. The hydrocracking catalyst of claim 1, wherein the base comprises 0.1 to 40 wt. % alumina, 30 to 80 wt. % ASA, about 0.1 to 40 wt. % USY zeolite, and 0.1 to 40 wt. % ZSM-12.

3. The hydrocracking catalyst of claim 2, wherein the amount of alumina ranges from about 20 to about 30 wt. %.

4. The hydrocracking catalyst of claim 2, wherein the amount of ASA ranges from about 55 to about 75 wt. %.

5. The hydrocracking catalyst of claim 2, wherein the amount of USY zeolite ranges from about 0.1 to about 10 wt. %.

6. The hydrocracking catalyst of claim 2, wherein the amount of ZSM-12 ranges from about 0.2 to about 10 wt. %.

7. The hydrocracking catalyst of claim 1, wherein the catalyst comprises the metals nickel (Ni) and tungsten (W) impregnated into the base as oxides.

8. The hydrocracking catalyst of claim 7, wherein the catalyst comprises from about 2 to 10 wt. % of nickel oxide and from about 8 to 40 wt. % of tungsten oxide based on the bulk dry weight of the hydrocracking catalyst.

9. The hydrocracking catalyst of claim 1, wherein the modifying agent comprises citric acid.

10. A hydrocracking process comprising a first hydrocracking stage and a second hydrocracking stage, with the second hydrocracking stage comprising the catalyst of claim 1, wherein the hydrocracking process comprises hydrocracking a hydrocarbon feed under hydrocracking conditions to produce an effluent and the second hydrocracking stage comprises hydrocracking the effluent under hydrocracking conditions.

11. The hydrocracking process of claim 10, wherein the catalyst base comprises 0.1 to 40 wt. % alumina, 30 to 80 wt. % ASA, about 0.1 to 40 wt. % USY zeolite and 0.1 to 40 wt. %, ZSM-12.

12. The hydrocracking process of claim 11, wherein the amount of alumina ranges from about 20 to about 30 wt. %.

13. The hydrocracking process of claim 11, wherein the amount of ASA ranges from about 55 to about 75 wt. %.

14. The hydrocracking process of claim 11, wherein the amount of USY zeolite ranges from about 0.1 to about 10 wt. %.

15. The hydrocracking process of claim 11, wherein the amount of ZSM-12 ranges from about 0.2 to about 10 wt. %.

16. The hydrocracking process of claim 10, wherein the effluent from the first hydrocracking stage comprises unconverted oil (UCO).

17. The hydrocracking process of claim 10, wherein the catalyst in the second hydrocracking stage comprises nickel (Ni) and tungsten (W) impregnated into the catalyst base as oxides.

18. The hydrocracking process of claim 17, wherein the catalyst in the second hydrocracking stage comprises from about 2 to about 10 wt. % of nickel oxide and from about 8 to about 40 wt. % of tungsten oxide based on the bulk dry weight of the hydrocracking catalyst.

19. The hydrocracking process of claim 10, wherein the catalyst in the second hydrocracking stage is prepared by a method comprising the steps of:
(a) forming an extrudable mass containing the catalyst support base,
(b) extruding the mass to form a shaped extrudate,
(c) calcining the mass to form a calcined extrudate,
(d) preparing an impregnation solution containing at least one metal nitrate or metal carbonate, a modifying agent and an ammonium containing component, and adjusting the pH of the impregnation solution to between 1 and 5.5 with a hydroxide base, inclusive,
(e) contacting the shaped extrudate with the impregnation solution, and
(f) drying the impregnated extrudate at a temperature sufficient to remove the impregnation solution solvent, to form a dried impregnated extrudate.

20. The hydrocracking process of claim 19, wherein the impregnation solution comprises nickel carbonate.

21. The hydrocracking process of claim 19, wherein the modifying agent is selected from the group consisting of compounds represented by structures (1) through (4), and condensated forms thereof:

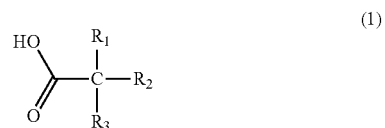

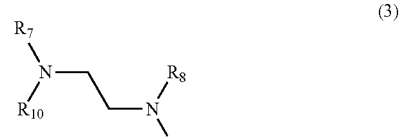

wherein:
(1) $R_1$, $R_2$ and $R_3$ are independently selected from the group consisting of hydrogen; hydroxyl; methyl; amine; and linear or branched, substituted or unsubstituted $C_1$-$C_3$ alkyl groups, $C_1$-$C_3$ alkenyl groups, $C_1$-$C_3$ hydroxyalkyl groups, $C_1$-$C_3$ alkoxyalkyl groups, $C_1$-$C_3$ aminoalkyl groups, $C_1$-$C_3$ oxoalkyl groups, $C_1$-$C_3$ carboxyalkyl groups, $C_1$-$C_3$ aminocarboxyalkyl groups and $C_1$-$C_3$ hydroxycarboxyalkyl groups;
(2) $R_4$ through $R_{10}$ are independently selected from the group consisting of hydrogen; hydroxyl; and linear or branched, substituted or unsubstituted $C_2$-$C_3$ carboxyalkyl groups; and
(3) $R_{11}$ is selected from the group consisting of linear or branched, saturated and unsaturated, substituted or unsubstituted $C_1$-$C_3$ alkyl groups, $C_1$-$C_3$ hydroxyalkyl groups, and $C_1$-$C_3$ oxoalkyl groups.

22. The hydrocracking process of claim 21, wherein the modifying agent comprises citric acid.

* * * * *